July 3, 1956  H. T. WHITE  2,752,857
MOTOR PUMP UNIT WITH AXIAL GAP MOTOR
Filed June 8, 1950  2 Sheets-Sheet 1

*INVENTOR*
BY HOWARD T. WHITE
ATTORNEY.

INVENTOR
HOWARD T. WHITE
BY ﾞ.T. Wolsensmith
ATTORNEY.

United States Patent Office 2,752,857
Patented July 3, 1956

2,752,857

MOTOR PUMP UNIT WITH AXIAL GAP MOTOR

Howard T. White, Philadelphia, Pa.

Application June 8, 1950, Serial No. 166,818

9 Claims. (Cl. 103—87)

This invention relates to motor driven pumps.

It is the principal object of the present invention to provide a motor driven pump which is simple in construction and effective in operation.

It is a further object of the present invention to provide a motor driven pump having a rotor and an improved bearing construction for the rotor.

It is a further object of the present invention to provide a motor driven pump having improved provisions for sealing the stator chamber.

It is a further object of the present invention to provide a motor driven pump in which the fluid gap between the motor stator and rotor will be reduced to a minimum.

It is a further object of the present invention to provide a motor driven rotor pump in which the pump rotor may be made of any desired size and independent of the size of the motor stator.

It is a further object of the present invention to provide a motor driven pump which may be employed in any desired position, horizontal, vertical, or inclined, in accordance with the installation requirements, which may be used as a submerged pump, and which will be quiet in its operation and of high efficiency.

Other objects and advantageous features of the invention will be apparent from the specification and claims.

The nature and characteristic features of the invention will be more readily understood from the following description, taken in connection with the accompanying drawings forming part hereof, in which.

Figure 1:
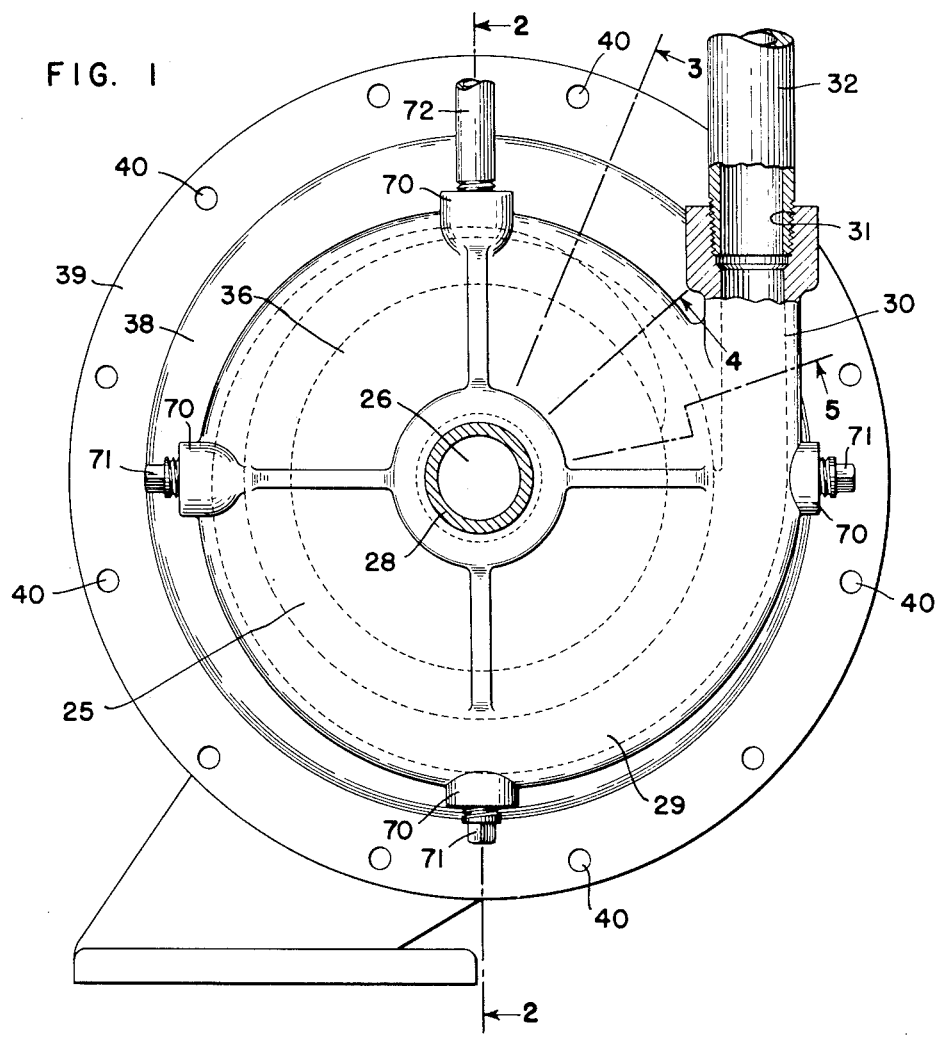
Figure 1 is a side elevational view of a motor driven pump in accordance with the present invention, parts being broken away to present the details of construction.
Figure 3:
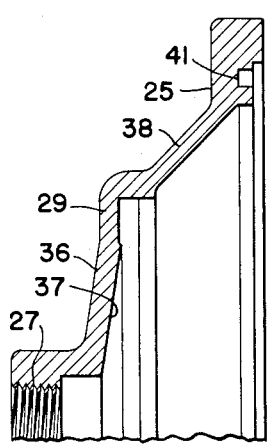
Fig. 3 is a fragmentary sectional view through a portion of the pump housing and taken approximately on the line 3—3 of Fig. 1.
Figures 4, 5:
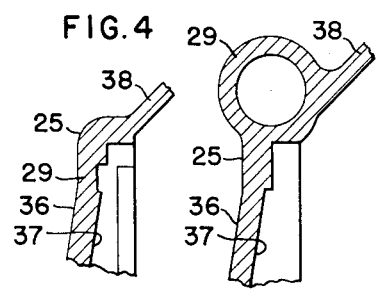
Fig. 4 is a similar fragmentary sectional view taken approximately on the line 4—4 of Fig. 1.
Fig. 5 is a similar fragmentary sectional view taken approximately on the line 5—5 of Fig. 1.
Figure 2:
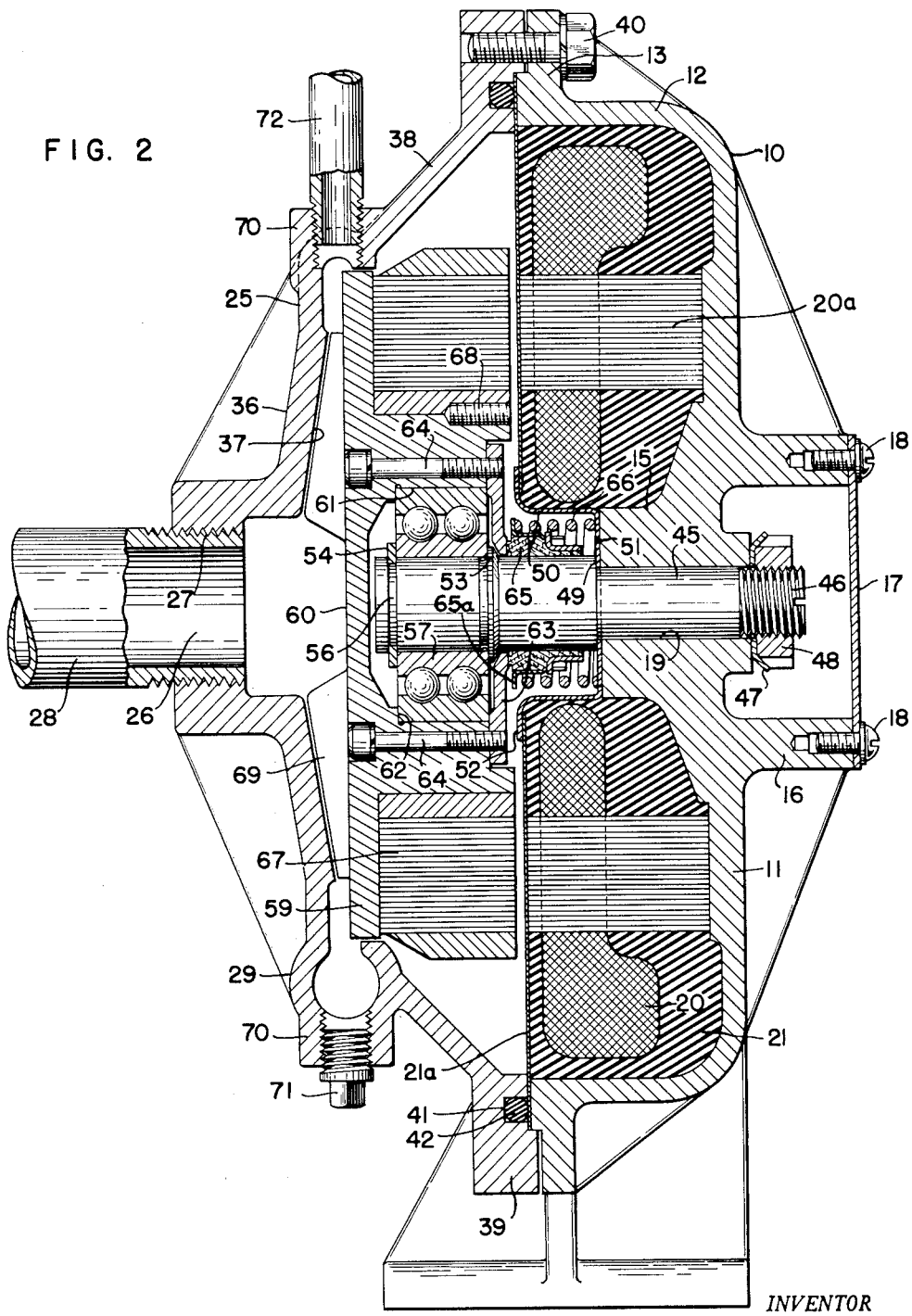
Fig. 2 is a central sectional view taken approximately on the line 2—2 of Fig. 1.

It should, of course, be understood that the description and drawings herein are illustrative merely, and that various modifications and changes may be made in the structure disclosed without departing from the spirit of the invention.

Like numerals refer to like parts throughout the several views.

Referring now more particularly to the drawings, in which a preferred embodiment of the invention is illustrated, the motor driven pump therein shown preferably includes, as part of a stationary housing a motor stator casing section 10, preferably made as a unitary casting, having a radially extending plate portion 11, and an axial flange 12, from which an outwardly disposed rim 13 extends. At the central portion of the plate 11, a hub 15 is provided, interiorly disposed, and on the outer face of the plate 11, a circular rim 16 is provided. The rim 16 is adapted to be closed, at its outer edge, by a plate 17 which is held in position by studs 18. The hub 15 has an interior bore 19, for purposes to be explained.

An interior space is thus provided in the stator casing 10, between the hub 15 and the flange 12 which has mounted therein the stator windings 20 and laminated core 20a of an axial fluid gap alternating current electric motor of the induction type. This interior space, after the stator 20 has been disposed therein, is preferably completely filled with an insulating and waterproofing sealing material 21, which is adapted to distribute the heat from the core 20a over the exterior face of the sealing material. The exterior face of the sealing material 21 is preferably ground to provide a smooth surface and is covered with a facing as at 21a which can be a thin plate of sheet material, but it is preferred to employ a coating of liquid-proof sealing material, such as varnish, lacquer, or the like. The sealing material 21 and the facing 21a have a central opening therethrough inwardly of the inner face of the hub 15. The facing 21a is adherent to the exterior face by reason of the vauum therebetween and by reason of the heat distribution thereover does not buckle or distort upon heating.

An impeller or rotor housing section 25 is provided, also as part of the stationary housing and in juxtaposed axial alignment with the section 10, preferably made as a unitary casting, and having a central axial inlet connection 26, at the portion thereof remote from the motor casing 10. The inlet connection 26 may, if desired, be internally threaded as at 27 for the attachment of a fluid inlet pipe 28. The impeller housing 25 is preferably provided with a scroll 29, having a tangentially disposed outlet connection 30 which may, if desired, be internally threaded as at 31, for the attachment of a fluid delivery pipe 32.

The housing 25 preferably has a frusto-conical portion 36, with an interior face 37, and has an outwardly disposed frusto-conical portion 38 with an outwardly extending rim 39 which is adapted to be secured or clamped to the rim 13 of the stator casing 10, and in clamping engagement with the facing 21a, by a plurality of studs 40. Within the rim 39, an annular groove 41 is provided for the reception of a sealing ring 42, preferably of the type known as an O-ring, for sealing engagement with the facing 21a extending over the contiguous face of the rim 13.

Within the bore 19, a fixedly mounted stub shaft 45 is provided, threaded at its outer end 46 for engagement by a lock washer 47 and nut 48 and having a shoulder 49.

A sealing and retaining cup 50 is preferably provided, extending into the central opening in the sealing material 21, having an inwardly extending rim 51 with which the shoulder 49 is adapted to engage, and having a radially outwardly extending flange 52 extending along the exterior facing 21a of the sealing material 21. The flange 52 is preferably not rigidly secured to the facing 21a but is in tight engagement therewith which permits radial expansion and contraction of the facing 21a.

Intermediate the shoulder 49 and the end of the stub shaft 45 opposite the threaded end 46, an outwardly extending circumferential rib 53 is provided.

At the outer end of the shaft 45, a snap ring 54 is mounted, in engagement in a groove 56 in the shaft 45, for clamping, on the shaft 45, the inner and stationary race of a combined thrust and radial ball bearing 57.

A rotor 60 is provided, in the interior of the housing 25. The rotor 60 has an outer rim 59 and has, in the central hub portion thereof a central bearing chamber bounded in part by the central portion of the rotor wall and by a central bore 61, which is surrounded by a cylindrically axially extending wall, with an inner shoulder 62 against which the movable and outer race of the bearing 57 is adapted to be held in engagement by a clamping and sealing closure plate 63. The plate 63 is held in engagement with the outer race of the bearing 57 by a plurality of studs 64 extending through the rotor 60 and in engagement with the plate 63.

In the space in the interior of the cup 50, a sealing closure member or packing 65 is provided, enclosed within a holding ring 65a, resiliently impelled by a spring 66 which bears against the ring 65a and against the rim 51. The packing 65 is held on the shaft 45 and against the plate 63, in sealing engagement, by the spring 66. The entrance of undesired fluid materials into the bearing 57 is prevented and the grease with which the ball bearing 57 is initially packed for lubrication is retained.

The rotor 60 is provided with a peripheral recessed portion on which the rotor elements 67 of the motor, for coaction with the stator windings 20, are mounted. The motor rotor elements 67 are preferably held in position by screws 68 in engagement therewith.

The rotor 60 has, on the side thereof opposite from the rotor elements 67, centrifugal fluid impeller blades 69, which may be of any preferred type, and spaced at the desired intervals on the side face of the rotor 60. The blades 69 preferably have relatively close clearance with respect to the inner face 37 of the rotor housing 25.

The clearance between the periphery of the rim 59 of the rotor, and the rotor housing 25 may be made relatively small, and in fact is preferably made smaller than the gap between the facing portions of the rotor elements 67 and the stator windings 20, to prevent the entrance of solid particles carried in the fluid being pumped.

At a plurality of predetermined locations on the scroll 29, taps 70 may be provided, closed with plugs 71 or for the connection of pipes 72 for priming or to permit of the withdrawal of air so that priming be effected in whichever position the pump is disposed.

The mode of operation will, it is thought, be apparent from the foregoing but will be summarized briefly.

With electric energy supplied to the windings 20 of the motor stator, rotation of the impeller 60 is effected by the force applied on the motor rotor elements 67.

Fluid is supplied through the fluid inlet pipe 28 to the inlet connection 26 to the impeller blades 69 and delivered thereby to the scroll 29 and from the scroll 29 is discharged through the delivery connection 30 and pipe 32.

It will be noted that the structure of the rotor 60 and the mounting thereof on the stub shaft 45 permits of ease of assembly and disassembly. At the same time the bearing 57, which accommodates both radial and thrust loads, is sealed and protected.

I claim:

1. In a motor pump, a stationary housing having a stator section and a rotor section in juxtaposed axial alignment, said sections having rim portions separable on a radial plane, an alternating current motor in said housing, said rotor section having a central axial fluid inlet connection and a fluid discharge connection, said stator section having a central hub terminating therein axially short of said radial plane, and an annular chamber therearound in which the stator of the motor is mounted, a sealing facing for said annular chamber disposed in said plane and having its periphery clamped between the rim portions of said stator and rotor sections and having a central opening, a cup shaped member having a portion in said opening in engagement with said hub and having a peripheral flange in engagement with said sealing facing, a removable stub shaft fixedly mounted in said hub and extending through said cup shaped member and into the rotor section, a rotor member including a centrifugal fluid impeller and the rotor of the motor in said rotor section, said rotor member having a bearing chamber therein into which said stub shaft extends, said bearing chamber having therein a rotor member supporting bearing mounted on said stub shaft, a closure member closing said bearing chamber, and a sealing member on said stub shaft interposed between said closure member and said cup shaped member and preventing fluid leakage with respect to said bearing chamber along said stub shaft said rotor member being disposed in alinement with the stator and spaced axially therefrom to provide an axial fluid gap between said motor rotor and said stator.

2. In a motor pump, a stationary housing having a stator section and a rotor section in juxtaposed axial alignment, said sections having rim portions separable on a radial plane, an alternating current motor in said housing, said rotor section having a fluid inlet and a fluid discharge, said stator section having a central hub terminating therein in spaced axial relation to said plane and an annular chamber therearound in which the stator of the motor is mounted, a sealing facing for said annular chamber disposed in said plane and extending inwardly from the rim portions of said sections, said sealing facing having a central opening, a cup shaped member having a portion in said opening in engagement with said hub and having a peripheral flange in engagement with said sealing member, a stub shaft fixedly mounted in said hub and extending through said cup shaped member and into the rotor section, a rotor member in said rotor section having a central wall portion with an enclosing wall extending axially therefrom to provide a central opening on the side thereof towards said stator section, said rotor member including the rotor of the motor disposed on one side of said central wall and radially outwardly of said enclosing wall and a centrifugal fluid impeller disposed on the other side of said central wall, means for mounting said rotor member for rotation on said stub shaft including a bearing mounted on said stub shaft and disposed in said central opening, and closure members closing said opening and maintaining said bearing in sealed relation in said rotor member, said last members having a holding portion in resilient engagement with said cup shaped member, and said rotor member being disposed in alinement with the stator and spaced axially therefrom to provide an axial fluid gap between said motor rotor and said stator.

3. In a motor pump, a stationary housing having a stator section and a rotor section in juxtaposed axial alignment, said sections having rim portions separable on a radial plane, an alternating current motor in said housing, said rotor section having a fluid inlet and a fluid discharge, said stator section having a central hub terminating therein axially in spaced axial relation to said plane and an annular chamber therearound in which the stator of the motor is mounted, a sealing member for said annular chamber disposed in said plane and extending inwardly from the rim portions of said sections, said sealing member having a central opening, a cup shaped member having a portion in said opening in engagement with said hub and having a peripheral flange in engagement with said sealing member, a stub shaft fixedly mounted in said hub and extending through said cup shaped member and into said rotor section, a rotor member in said rotor section having a central wall portion with a hollow cylindrical wall extending from one side thereof towards said stator section, the interior of said cylindrical wall providing a central chamber closed on one side by said central wall portion and open towards said stator section, said rotor member including the rotor of the motor disposed on said one side thereof and radially outwardly of said hollow cylindrical wall and a centrifugal fluid impeller disposed on the other side of said central wall portion, means for mounting said rotor member for rotation on said stub shaft including a combined radial and thrust bearing mounted on said stub shaft and disposed in said central chamber, a closure plate closing said central chamber on said stator section side, and sealing means on said shaft in engagement with said closure plate and said cup shaped member for preventing fluid leakage with respect to said central chamber along said stub shaft, said rotor member being disposed in alinement with the stator and spaced axially therefrom to provide an axial fluid gap between said motor rotor and said stator.

4. In a motor pump, a stationary housing having a stator section and a rotor section in juxtaposed axial alignment, said sections having rim portions separable on a radial plane, an alternating current motor in said housing, said rotor section having a fluid inlet and a fluid discharge, said stator section having a central hub terminating therein in spaced axial relation to said plane and an annular chamber around said hub in which the stator of the motor is mounted, a sealing facing member on the inner face of said stator disposed in said plane and having a central opening, a cup shaped member having a portion disposed in said opening and having an outwardly disposed radial flange in engagement with said facing member and an inwardly disposed radial portion in engagement with said hub, a stub shaft mounted in said hub and extending through said cup shaped member into said rotor section, a member on said stub shaft for urging said flange into engagement with said sealing member and said radial portion into engagement with said hub, and a rotor member in said rotor section including a centrifugal fluid impeller and the rotor of the motor, said rotor member being disposed in alinement with the stator and spaced axially therefrom to provide an axial fluid gap between said motor rotor and said stator.

5. In a motor pump, a stationary housing having a stator section and a rotor section in juxtaposed axial alignment, said sections having rim portions separable on a radial plane, an alternating current motor in said housing, said rotor section having a fluid inlet and a fluid discharge, said stator section having a central hub terminating therein axially in spaced axial relation to said plane and an annular chamber therearound in which the stator of the motor is mounted, a sealing facing member in engagement with the inner face of said stator disposed in said plane and having a central opening, a cup shaped member having a portion disposed in said opening and having an outwardly extending flange in engagement with said facing member, a stub shaft fixedly mounted in said hub and extending through said cup shaped member into the rotor section, said stub shaft having an abutment portion in engagement with said cup shaped member, a rotor member in said rotor section rotatably mounted on said stub shaft and including a centrifugal fluid impeller and the rotor of the motor, said rotor member being disposed in alinement with the stator and spaced axially therefrom to provide an axial fluid gap between said motor rotor and said stator facing.

6. In a motor pump, a stationary housing having a stator section and a rotor section in juxtaposed axial alignment, said sections having rim portions separable on a radial plane, an alternating current motor in said housing, said rotor section having a fluid inlet and a fluid discharge, said stator section having a central hub terminating therein axially in spaced axial relation to said plane and an annular chamber around said hub in which the stator of the motor is mounted, a sealing facing member on the inner face of said stator disposed in said plane and having a central opening, a cup shaped member having a portion disposed in said opening and having an outwardly extending flange in engagement with said facing member and a central portion in engagement with said hub, a removable stub shaft fixedly mounted in said hub, said stub shaft extending through said central portion and having a shoulder in engagement with said central portion, a rotor member in said rotor section including a centrifugal fluid impeller and the rotor of the motor, means for mounting said rotor member for rotation on said stub shaft including a closed central chamber in said rotor member with an opening towards said stator section, a bearing on said stub shaft in said central chamber, a closure member closing said opening and carried by said rotor member, a sealing member on said stub shaft in engagement with said closure member for preventing fluid leakage along said stub shaft at said closure member, and a resilient member interposed between said sealing member and said central portion, said rotor member being disposed in alinement with the stator and spaced axially therefrom to provide an axial fluid gap between said motor rotor and said stator.

7. In a motor pump, a stationary housing having a stator section and a rotor section in juxtaposed axial alignment, said sections having rim portions separable therefrom on a radial plane, an alternating current motor in said housing, said rotor section having a fluid inlet and a fluid discharge, said stator section having a central hub terminating therein in spaced relation axially to said plane and an annular chamber therearound in which the stator of the motor is mounted, a removable stub shaft fixedly mounted in said hub and extending into the rotor section, a rotor member in said rotor section having a central radially disposed wall portion with a hollow cylindrical wall portion extending axially from one side thereof towards the stator section, the interior of said cylindrical wall portion providing a central chamber closed on one side by said central wall and open towards said stator section, said rotor member including the rotor of the motor disposed on said one side thereof and outwardly of said hollow cylindrical wall and a centrifugal fluid impeller disposed on the other side of said central wall portion, means for mounting said rotor member for rotation on said stub shaft including a bearing on said stub shaft and in said central chamber, a closure member closing said opening carried by said rotor member and in retaining engagement with a portion of said bearing, a bearing retaining shoulder on said shaft, sealing means on said shaft in engagement with said closure member and preventing fluid leakage along said shaft, and a resilient member on said shaft for urging said sealing means into engagement with said shaft and said closure member, said rotor member being disposed in alinement with the stator and spaced axially therefrom to provide an axial fluid gap between said motor rotor and said stator.

8. In a motor pump unit, a housing having an intake passage and a volute discharge passage and having an annular chamber between said intake passage and said discharge passage, an axial fluid gap motor having its stator secured in an end wall of the housing, a shaft fixed at one end to said end wall and extending into said chamber, an impeller adapted to be supported on said shaft in axially spaced relation to said stator and having passages leading from the intake passage to the discharge passage, the rotor of the motor being mounted on the side wall of the impeller adjacent said stator, a disc-shaped stator sealing member secured at its outer periphery to a wall of the housing and having a central aperture receiving said shaft, a bearing structure mounted on the shaft and supporting said impeller on the shaft, spaced thrust bearing collars on the shaft engaging opposite ends of the bearing structure, and a sealing structure located between said stator sealing member and the adjacent bearing collar and forming a seal between said central aperture of said stator sealing member and said shaft.

9. In a motor pump unit, a housing having an intake passage and a volute discharge passage and having an annular chamber between said intake passage and said discharge passage, an axial fluid gap motor having its stator secured in an end wall of the housing, a shaft fixed at one end to said end wall and extending into said chamber, an impeller adapted to be supported on said shaft in axially spaced relation to said stator and having passages leading from the intake passage to the discharge passage, the rotor of the motor being mounted on the side wall of the impeller adjacent said stator, a disc-shaped stator sealing member secured at its outer periphery to a wall of the housing and having a central aperture receiving said shaft, a bearing structure mounted on the shaft and supporting said impeller on the shaft, spaced thrust bearing collars on the shaft engaging opposite ends of the bearing structure, and a sealing structure located between said stator sealing member and the adjacent bearing collar and forming a seal between said central aperture of said stator sealing member and said shaft, said sealing structure including an annular sealing element engaging said shaft and means engaging said sealing element to place said element under compression.

References Cited in the file of this patent

UNITED STATES PATENTS

| | | |
|---|---|---|
| 592,244 | Fay | Oct. 26, 1897 |
| 1,233,569 | Graemiger | July 17, 1917 |
| 1,585,566 | Sindl | May 18, 1926 |
| 1,678,380 | Cooper | July 24, 1928 |
| 1,705,263 | McIlvaine | Mar. 12, 1929 |
| 2,245,577 | Dieckman | June 17, 1941 |
| 2,278,397 | Scheibe et al. | Mar. 31, 1942 |
| 2,429,114 | Whitted | Oct. 14, 1947 |
| 2,438,629 | Anderson | Mar. 30, 1948 |
| 2,444,687 | Widakowich | July 6, 1948 |
| 2,481,172 | Staggs | Sept. 6, 1949 |
| 2,534,520 | Katcher | Dec. 19, 1950 |
| 2,557,879 | Lewis et al. | June 19, 1951 |
| 2,649,048 | Pezzillo et al. | Aug. 18, 1953 |

FOREIGN PATENTS

| | | |
|---|---|---|
| 192,618 | Great Britain | Feb. 8, 1923 |
| 582,036 | Great Britain | Nov. 1, 1946 |